(12) United States Patent
Drosch

(10) Patent No.: US 9,442,667 B2
(45) Date of Patent: Sep. 13, 2016

(54) APPARATUS AND METHOD FOR PROTECTION OF STORED DATA

(71) Applicant: Klaus Drosch, Jarfalla (SE)

(72) Inventor: Klaus Drosch, Jarfalla (SE)

( * ) Notice: Subject to any disclaimer, the term of this patent is extended or adjusted under 35 U.S.C. 154(b) by 0 days.

(21) Appl. No.: 14/420,350

(22) PCT Filed: Aug. 6, 2013

(86) PCT No.: PCT/SE2013/050954
§ 371 (c)(1),
(2) Date: Feb. 6, 2015

(87) PCT Pub. No.: WO2014/025307
PCT Pub. Date: Feb. 13, 2014

(65) Prior Publication Data
US 2015/0199144 A1     Jul. 16, 2015

Related U.S. Application Data

(60) Provisional application No. 61/680,413, filed on Aug. 7, 2012.

(30) Foreign Application Priority Data

Aug. 7, 2012  (SE) ...................................... 1250918

(51) Int. Cl.
| | | |
|---|---|---|
| G06F 21/00 | (2013.01) | |
| H04L 29/06 | (2006.01) | |
| G06F 3/06 | (2006.01) | |
| G06F 21/56 | (2013.01) | |
| G06F 21/62 | (2013.01) | |

(52) U.S. Cl.
CPC ............. *G06F 3/0622* (2013.01); *G06F 3/067* (2013.01); *G06F 3/0644* (2013.01); *G06F 21/56* (2013.01); *G06F 21/6218* (2013.01)

(58) Field of Classification Search
CPC .... G06F 3/0622; G06F 3/067; G06F 3/0644; G06F 21/6218; G06F 21/56
See application file for complete search history.

(56) References Cited

U.S. PATENT DOCUMENTS

| | | | |
|---|---|---|---|
| 2003/0028799 A1* | 2/2003 | Cordella, Jr. ........... | G06F 21/57 726/17 |
| 2004/0068653 A1* | 4/2004 | Fascenda .............. | H04L 9/0844 713/168 |
| 2008/0049251 A1* | 2/2008 | Shimada ................... | B42B 4/00 358/1.15 |
| 2009/0245215 A1* | 10/2009 | Oshime ................. | H04W 88/06 370/338 |

(Continued)

FOREIGN PATENT DOCUMENTS

| | | |
|---|---|---|
| WO | 0248844 A2 | 6/2002 |
| WO | WO 02/48844    * | 6/2002 |

*Primary Examiner* — Lisa Lewis
(74) *Attorney, Agent, or Firm* — Thomas A. Runk; Fulwider Patton LLP

(57) ABSTRACT

An apparatus and a method for protection of data stored in a data storage unit that comprises a plurality of storage areas. A data interface connects to a computer system and transfer of a data signal from the computer system to the apparatus requests access to the data storage unit. A main control unit is configured to receive the data signal and is connected to the data storage unit. A user control unit is connected to the main control unit and is arranged to be set in different modes and generates a mode selection signal indicating the selected mode. The main control unit is configured to receive the mode selection signal, and depending on the selected mode, control connection of the apparatus to a plurality of networks, and direct the request to a storage area of the plurality of storage areas of the data storage unit.

17 Claims, 8 Drawing Sheets

(56) References Cited

U.S. PATENT DOCUMENTS

2010/0214682 A1* 8/2010 Boyle ............... G11B 20/1258
360/39

2011/0082993 A1 4/2011 Drosch
2011/0231926 A1* 9/2011 Ellis ..................... G06F 21/71
726/11

* cited by examiner

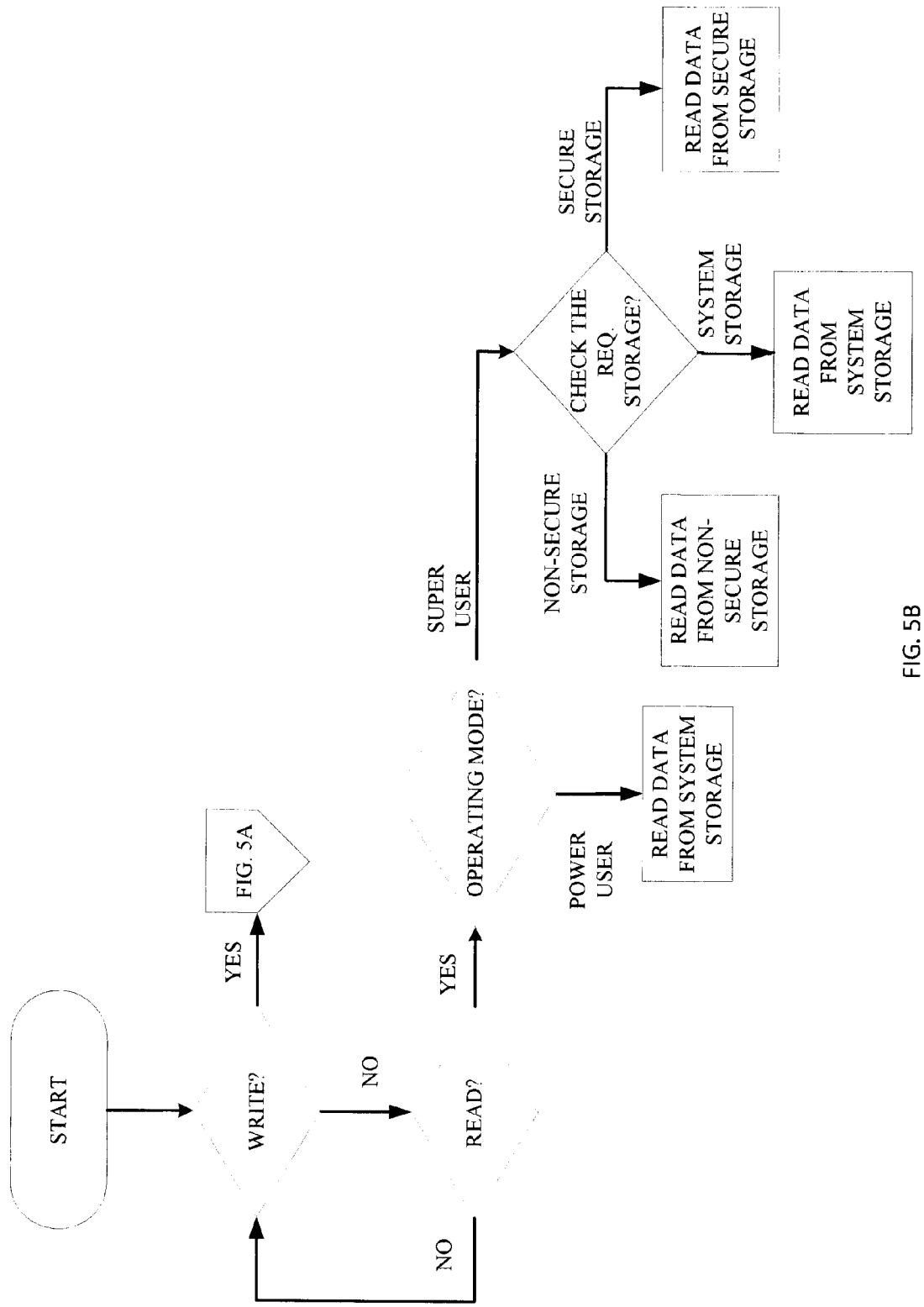

APPARATUS AND METHOD FOR PROTECTION OF STORED DATA

RELATED APPLICATIONS

This is a U.S. national phase application of International application no. PCT/SE2013/050954 filed Aug. 6, 2013, which claims priority to Swedish application no. 1250918-8, filed Aug. 7, 2012, and claims the benefit of U.S. provisional application No. 61/680,413, filed Aug. 7, 2012, all of which are incorporated herein by reference.

FIELD OF THE INVENTION

The present invention relates to an apparatus and a method for protection of 5 stored data according to the preamble of the independent claims. More specifically, it relates to the area of protection of data from malicious software and remote access from intruders.

BACKGROUND OF THE INVENTION

Malicious software, or malware, is a generic term for computer programs designed to cause damage to a single computer, server or computer network. Common types of malware are viruses, spyware, trojans, rootkits etc.

Viruses are computer programs or scripts that attempt to spread from one file to another on a single computer and/or from one computer to another, using a variety of methods. Spyware is a program that runs on your computer and e.g. tracks your habits and tailors these patterns for advertisements, etc. Trojans typically do one of two things: they either destroy or modify data the moment they launch, such as erase a hard drive, or they attempt to ferret out and steal passwords, credit card numbers, and other such confidential information.

A malicious code scanner is the most common tool for prevention. They can provide real time protection against the installation of malware software on a computer. This type of anti-malware software scans all incoming network data for malware software and blocks any threats it comes across. Anti-malware software programs can also be used solely for detection and removal of malware software that has already been installed onto a computer. This type of anti-malware software scans e.g. the contents of the Windows registry, operating system files, and installed programs on a computer and will provide a list of any threats found, allowing the user to choose which files to delete or keep, or to compare this list to a list of known malware components, removing files that match.

Rootkits is a technique which allows concealment of the installed malicious program or intrusion of a human attacker, to avoid detection by an antimalware program, by modifying the host's operating system such that the malware is hidden for the user. Rootkits can prevent a malicious process from being visible in the system's list of processes, or keep its files from being read. Rootkit detection is difficult because a rootkit may be able to subvert the software that is intended to find it. Removal can be complicated or practically impossible, especially in cases where the rootkit resides in the kernel; reinstallation of the operating system may be the only available solution to the problem.

From WO-2009/148374-A1 a hardware protection device is known, which provides protection of the data storage of the computer system which is transparent to the computing system and to the user of the computing system. The device protects the user from malicious code by preventing its execution and the unauthorized or unwanted user data modification by making the contents of one of the storage devices read only. The operations of the device are not visible to the computer system or the user of the system. The device provides prevention of data modification and prevention of malicious code execution.

There is still a need for improvements in this area, to prevent intruders to get access to information on a computer system. The object of the invention is thus to provide an improved apparatus to prevent an intrusion into a computer system, or at least reduce the effects of an intrusion.

SUMMARY OF THE INVENTION

According to one aspect, the above-mentioned object is at least partly achieved by an apparatus for protection of data stored in a data storage unit comprising a plurality of storage areas according to the independent claim. The apparatus comprises: a data interface for connection to a computer system and transfer of one or more data signals from the computer system to the apparatus indicating request(s) for access to the data storage unit, and a main control unit configured to receive the data signals, wherein the main control unit is connected to the data storage unit. The apparatus further comprises a user control unit connected to the main control unit, wherein the user control unit is arranged to be set in different modes and to generate a mode selection signal indicating a selected mode. The main control unit is configured to receive the mode selection signal, and in dependence on the selected mode: i) control connection of the apparatus to a plurality of networks; and ii) direct the request(s) to a storage area of the plurality of storage areas of the data storage unit. The apparatus is connectable to a computer system via an interface and acts as data storage of the computer system with data protection circuitry as a single device. The apparatus will be transparent to the computer system and to the user who is using the computer, and the computer system and the user will not be able to distinguish the apparatus from an usual data storage of the computer. The computer system sends requests for e.g. read and/or write operations and depending on a selected mode, the operations are directed to a certain storage area. Thus, if the user wants to use a network that is unsecure, e.g. Internet, access to certain storage areas is restricted to protect stored data from being stolen. The apparatus provides hardware security to secure data on the data storage unit. The user control unit enables for the user to use different networks with a suitable security level, i.e. secure mode and un-secure mode. The user control unit is preferably a hardware unit, giving a hardware security level on the mode selections. A higher security level is preferably given if the used network is Internet. Thus, the apparatus prevents data from being stolen by intruders coming via Internet.

According to one embodiment, the plurality of networks comprises a LAN (Local Area network) and/or a WAN (Wide Area Network). Thus, if the user of the computer system wants to work with a LAN, a lower security can be had and more access to the storage areas of the data storage unit can be given than if the user of the computer system wants to work with a WAN.

According to one embodiment, the main control unit comprises access rules for respective mode for access of the storage areas. Thus, depending on the selected mode of the user control unit, the main control unit directs access requests like write and read operations to different storage areas according to access rules of the different modes. As the selected mode also determines to which network the computer system is operatively connected to, access to the storage areas thus depends on to which network the computer system is connected to.

According to one embodiment, the plurality of storage areas comprises a system storage area divided into sub storage areas of which one is allowed writing to, and wherein said main control unit is configured to update an internal table indicating where data has been written in said sub storage area when data is written in said sub storage area which is allowed writing to. By dividing the system storage into sub storage areas, the system storage may comprise areas of which one is allowed writing to and another sub storage area where e.g. the operating system of the computer and low level instructions are stored and to which the normal user is not allowed to write. This means that changes made to the operating system etc. when a normal user is using the computer system can be kept separated from the originally code of the operating system. Thus, the code of the operating system will remain untangled from possible malicious code. The main control unit keeps track on where data is kept by having an internal table in a local memory of the apparatus, which is updated when data is written in the sub storage area which is allowed writing to. The division of the system storage will thus not be visible to the computer system or user of the system.

According to another embodiment, the plurality of storage areas comprises a system storage area divided into sub storage areas of which one is allowed writing to, and wherein the main control unit is configured to check an internal table indicating where data has been written in the sub storage area allowed writing to, and reading from one of the sub storage area in dependence of the result of the checking. Thus, when a read request is received from a computer system via the data interface for reading from the system storage area, the main control unit checks the internal table to see if data regarding this request has been written in the sub-area allowed writing to. If this is the case, then data is read from the sub-area allowed writing to. Otherwise, data is read from the other sub storage area. With this configuration, it is possible to divide the system storage in sub 20 storage areas, without letting the computer system or user know about the division. The main control unit will answer read requests to the system storage as if the system storage was not divided.

According to another embodiment, the main control unit is configured to delete all data from the sub storage area allowed writing to in response to a mode selection signal indicating a mode different from a current mode. Thus, when the user changes mode with the user control unit, a mode selection signal is generated which is sent to the main control unit. The main control unit receives this signal, and compares the selected mode with the current mode of the apparatus. In response to a changed mode, the main control unit deletes all data from the sub storage area allowed writing to. Malicious code often wants to be stored where code automatically is run. This happens e.g. when the operating system is starting up. If the malicious code attempts to be saved where the operating system is stored, the malicious code will be stored in the sub storage area to which it is allowed to write. As this area is erased in response to a mode change, the malicious code will never have the chance to get executed when the operating system etc. starts up.

According to one embodiment, the plurality of storage areas comprises a secure storage area which is not accessible when the apparatus is connected to WAN. Thus, when the apparatus and thus the computer system is connected to e.g. Internet, the computer system is not allowed to write to or read from the secure storage area. The secure storage area is thus not visible to the computer system and the user, and potential intruders will thus not see the secure storage area or the content thereof. The secure storage will then be protected from intruders from e.g. Internet, as the secure storage will not be visible for the computer system if connected to Internet. As the computer system does not know that the secure storage exists, no malicious code or intruders can steel any data from the secure storage.

According to one embodiment, the plurality of storage areas comprises a nonsecure storage area which is write protected when the apparatus is connected to LAN. Thus, when the apparatus and thus the computer system is connected to LAN, the computer system is not allowed writing in the non-secure area. This configuration will protect data from being transferred via WAN (e.g. Internet) if malware accidently is run when in a secure mode, as will be explained further down.

According to a second aspect, the above-mentioned object is at least partly achieved by a method for protection of data stored in a data storage unit in an apparatus, wherein the data storage unit comprises a plurality of storage areas. The method comprises the steps of: A) selecting a mode of operation for the apparatus; B) controlling connection of the apparatus to a plurality of networks depending on the selected mode; C) receiving one or more requests for access to the data storage unit; D) directing the one or more requests to a storage area of the plurality of storage areas depending on selected mode.

According to a third aspect, the above-mentioned object is achieved by a computer-usable medium comprising a computer program code configured to cause a processor to execute the method previously explained and the method steps described in the detailed description of preferred embodiments of the invention.

According to a fourth aspect, the above-mentioned object is achieved by a computer system comprising an apparatus as previously explained or according to any of the embodiments described herein.

Preferred embodiments are set forth in the dependent claims and in the detailed description.

SHORT DESCRIPTION OF THE APPENDED DRAWINGS

Below the invention will be described in detail with reference to the appended figures, of which:

FIG. 5B shows a flowchart of the steps of the method according to one embodiment of the invention, when an administrator attempts to read in a memory of the apparatus.

DETAILED DESCRIPTION OF PREFERRED EMBODIMENTS OF THE INVENTION

Figure 1:
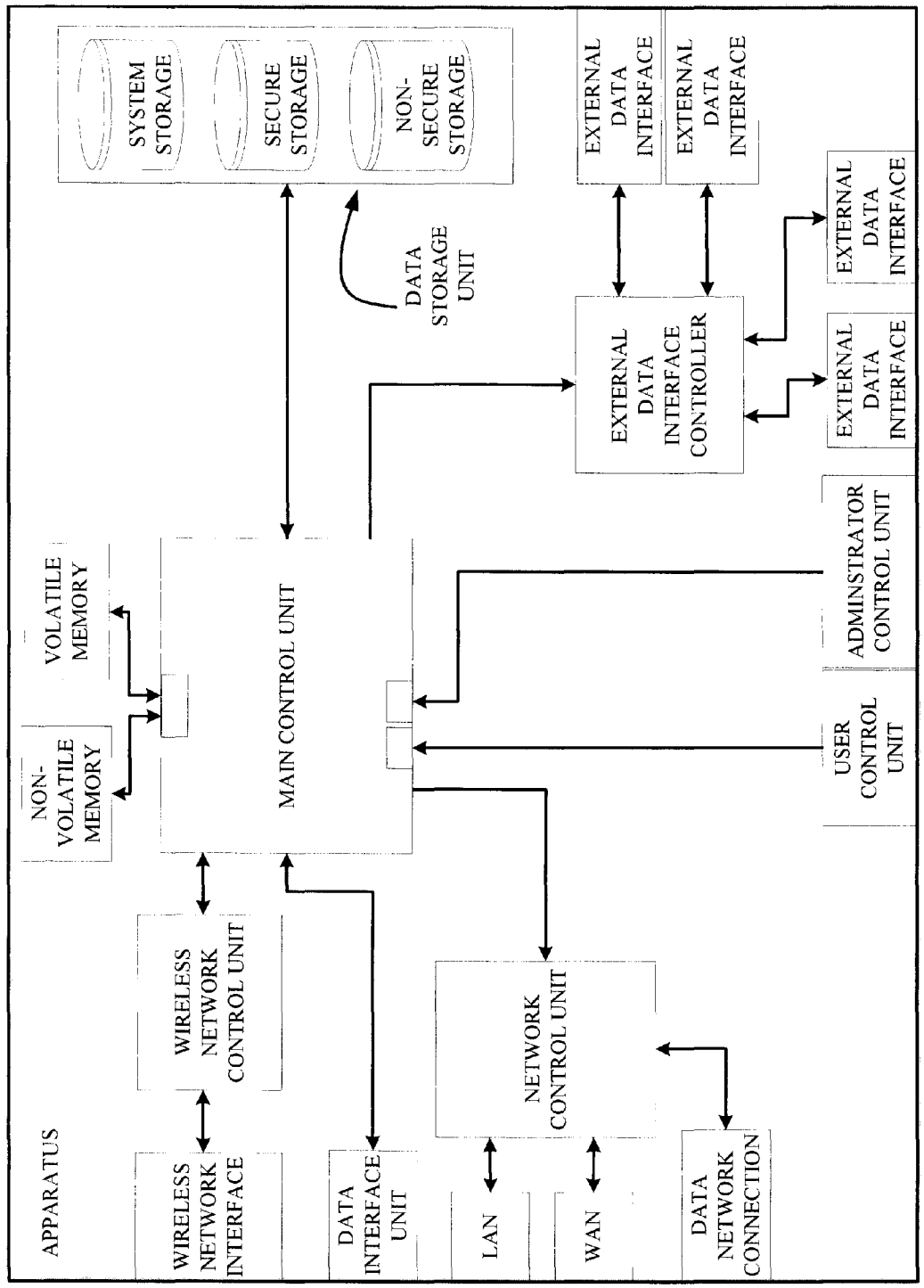
FIG. 1 shows an apparatus for protection of data stored in a data storage device according to one embodiment of the invention.

The apparatus of the invention according to one embodiment is described in FIG. 1, and the apparatus will now be described in relation to this figure.

The apparatus substitutes the regular storage space of the computer system with the apparatus itself comprising a data storage unit. The apparatus communicates with the operating system of a computer system via a data interface unit as shown in FIG. 1. Via the data interface unit, transfer of one or more data signals from the computer system to the apparatus indicating request(s) for access to the data storage unit is made. In the FIG. 1 the data storage unit comprises three data storage areas named system storage, secure storage and non-secure storage. It is understood that the storage unit may comprise a different number of storage areas, and the illustrated number of data storage areas only is for illustrative purposes. One or several of the data storage areas may be physically separated from the other data storage areas, or may reside on the same physical media.

The system storage area is according to one embodiment divided into two sub storage areas. The system storage area is available for both read and write operations requested from the computer system. One of the sub storage areas is visible to the computer system, hereafter called primary storage area. Another sub storage area is invisible to the computer system, hereafter called auxiliary storage area. The primary storage area allows only read operations of the normal user. The data stored in the primary storage area comprises the operating system (OS) and other useful code. According to one embodiment, only an administrator with special rights controlled in hardware is allowed to modify this primary storage area, as will be explained in the following.

Both read and write operations are allowed to the auxiliary storage area. When the operating system of the computer system sends a request to write in the system storage area, then data is written in the auxiliary storage area. This auxiliary storage area is visible to the main control unit of the apparatus. The operating system of the computer system can later read this data from the system storage. According to one embodiment, the writing in the auxiliary storage area is not a permanent write. It is a fake write, and whenever the apparatus changes mode a reboot is made, and the data from the auxiliary storage area will be erased and the system storage area will return to an original state as it was when the computer system was started.

The secure storage area is the normal working area for the user when the apparatus is in secure mode, as will be explained in the following. In this mode it is possible to store data in the secure storage area and to read data from the same.

The non-secure storage area is the normal working area for the user when the device is in non-secure mode, as will be explained in the following. In this mode it is possible to store data in the non-secure storage area and to read data from the same.

The main control unit controls the data flow between the computer system and the storage unit, and also controls the connection of the computer system to different networks such as LAN and/or WAN. The apparatus thus has full control over the network connection. The main control unit is further configured to receive data signals from the computer system, wherein the data signals indicate e.g. read and/or write requests. The main control unit is of course also configured to send e.g. written data back to the computer system.

The main control unit is connected to a user control unit arranged to be set in different modes and to generate a mode selection signal indicating a selected mode. The main control unit is configured to receive the mode selection signal, and in dependence on the selected mode control connection of the apparatus to a plurality of networks, and direct the access request(s) of writing or reading to a storage area of the plurality of storage areas of the data storage unit. The main control unit thus keeps track of the network connectivity and to which mode the apparatus is set. This main control unit is further transparent to the operating system of the computer system, thus, the main control unit is not visible to the operating system.

The user control unit can be set to different modes by a user. The unit is a hardware unit which preferably is set from the outside of the computer system and apparatus. The unit may comprise a switch with two or more states, one state for each mode. Whenever a mode is selected, a mode selection signal indicating the selected mode will be sent to the main control unit. The main control unit will act according to rules for the selected mode, e.g. give access to different storage areas, control connection to networks and/or external data interfaces. The main control unit will monitor the signals and check if there has been a change in mode from the current mode. If a change in mode is made, then the main control unit is configured to make a reboot such that the content of the auxiliary data storage area will be erased. Thus, if malicious code has been written in the auxiliary storage area, then this code will be erased.

The main control unit is configured to keep track of to which sub storage area of the system storage area data has been written by means of one or several internal tables stored in a local storage, e.g. a volatile memory as indicated in FIG. 1. Thus, if data has been written in the auxiliary storage area, the main control unit thus updates an internal table in the local storage indicating where data has been written. This may be accomplished by setting a flag in the shape of a RAM bit (Random Access Memory) corresponding to the sector where data has been written to a high state. When a request for reading in the system storage area is received from the computer system, the main control unit is configured to check the internal table indicating if and where data has been written in the auxiliary storage area. If the RAM bit in the sector where the data is to be found is set in a high state, then data is read from the sector in the auxiliary storage area. If the RAM bit is set to a low state, then data is read from the primary storage area. When the apparatus is on, the internal table preferably is stored in a volatile memory. A non-volatile memory may be used when the apparatus is turned off to back-up the volatile memory. Whenever the apparatus changes mode and thus a reboot is made, data on the non-volatile memory and volatile memory will be erased. Thus, in response to a mode selection signal indicating a different mode than the present mode, the main control unit is configured to delete the one or several internal tables present on the local storage. In this way, there will be no traces left indicating that data has been written to the auxiliary storage area and that an auxiliary storage area exists. Thus, in response to a mode change, preferable both the content on the auxiliary data storage area and content of the local storage concerning the internal table(s) will be erased.

The apparatus comprises according to one embodiment a network control unit configured to control the network connection to the apparatus and computer system, e.g. LAN or WAN. The network control unit is controlled by the main control unit and input from a user via the user control unit. According to one embodiment, the functionality of the network control unit is incorporated in the main control unit.

The apparatus has several interfaces for network connection. In the FIG. 1, three network connections are shown, one for LAN and one for WAN and a third for the internal Computer Network card. According to one embodiment the main control unit has implemented the functionality of a SATA port (Serial AT Attachment port), which is used to connect the several storage areas to the main control unit. With this functionality, the main control unit may physically close communication to one or several storage areas in the data storage unit.

The apparatus works in one of several modes, which mode is set by one or several mode control units. According to one embodiment, the apparatus comprises two different mode control units, one user control unit which previously has been explained, and one administrator control unit. The user control unit comprises according to one embodiment two modes, one secure mode and one un-secure mode. In the secure mode, LAN will be connected to the computer, and in the un-secure mode WAN will be connected to the computer. In response to a mode change to secure mode the apparatus disconnects from the WAN, e.g. Internet, and connects to the LAN, e.g. Intranet, automatically by means of the network control unit. In response to a mode change to non-secure mode it disconnects from the LAN, e.g. Intranet, and connects to the WAN, e.g. Internet. Depending on the selected mode, the main control unit directs access requests like write and read operations to different storage areas according to access rules in the main control unit for the different modes. The administrator control unit is, just like the user control unit, connected to the main control unit. The administrator control unit may have two modes, one super user mode and one power user mode. According to one embodiment, the user control unit and the administrator control unit are incorporated in the same unit.

The apparatus comprises according to one embodiment a wireless network control unit connected to a wireless network interface and to the main control unit. The wireless network control unit is configured to control the connection of the apparatus to a wireless network in dependence on the selected mode. According to one embodiment, the network control unit is configured to disable the connection to a wireless network when in a secure mode and/or to enable the connection to a wireless network in a non-secure mode. This functionality will enhance the security in a secure mode. The functionality of the network control unit may according to one embodiment be incorporated in the main control unit.

The apparatus comprises according to one embodiment an external data interface controller connected to one or several external data interfaces, as indicated in the FIG. 1. One example of an external data interface is USB (Universal Serial Bus). The external data interface controller is configured to control the connection of the apparatus to the one or several external data interfaces in dependence on the selected mode. According to one embodiment, the external data interface controller is configured to disable the connection to one or several external data interfaces when in a secure mode and/or to enable the connection to the one or several external data interfaces in a non-secure mode. This functionality will enhance the security in a secure mode. The functionality of the external data interface controller may according to one embodiment be incorporated in the main control unit.

Figure 2:
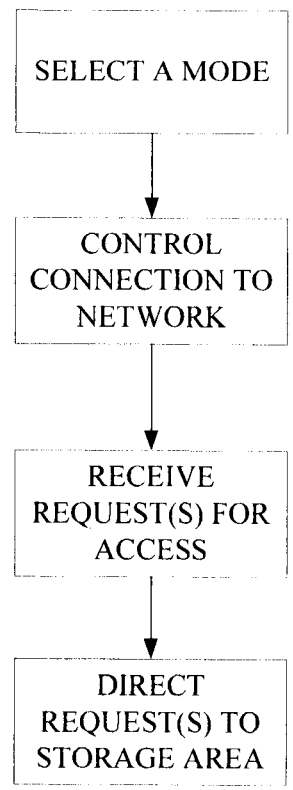
FIG. 2 shows a flowchart of the method for protection of stored data according to one embodiment of the invention.

The invention also relates to a method for protection of data stored in a data storage unit in an apparatus, wherein the data storage unit comprises a plurality of storage areas. The method is illustrated in the flow chart of FIG. 2 and will now be explained in relation thereto. The method comprises a first step of selecting a mode of operation for the apparatus. This can be accomplished as previously explained by e.g. changing the mode with a user control unit. The second step of the method comprises controlling connection of the apparatus to a plurality of networks depending on the selected mode. The selected mode thus indicates which network the apparatus shall be connected to according to predetermined rules, and the main control unit changes the connection to a network according to the mode. The third step of the method comprises receiving one or more requests for access to the data storage unit. Request comes from the computer system connected to the apparatus via an interface, and may comprise read and/or write requests. The requests may also indicate where data is desired to be read or written, e.g. in the system storage of the computer or the regular working area of the computer. The system storage corresponds to the system storage area of the data storage unit in the apparatus, and the regular working area corresponds to the secure storage area or the non-secure storage area depending on the selected mode. The forth step of the method comprises directing the one or more requests to a storage area of the plurality of storage areas depending on selected mode. The requests are according to one embodiment directed to a storage area in accordance with access rules for respective mode. Thus, if in e.g. a secure mode, data is read or written from the secure storage area, and if in a non-secure mode, data is read or written from the non-secure storage area. The access rules thus indicate how read and/or write requests should be handled by the main control unit. According to one embodiment, the method may also comprise the steps of controlling connection to wireless network and/or control connection of external data interface(s), as will be explained in the following.

According to one embodiment, the plurality of storage areas comprises a system storage area divided into sub storage areas of which one is allowed writing to. This area is also named auxiliary storage area. The method comprises according to one embodiment the step of updating an internal table indicating if data has been written in the sub storage area when data is written to the auxiliary storage area (thus the sub storage area which is allowed writing to). According to another embodiment, the method comprises the steps of checking an internal table indicating if data has been written in the auxiliary storage area (thus the sub storage area allowed writing to), and reading from one of the sub storage areas in dependence of the result of the checking.

According to another embodiment, the method comprises deleting all data of the auxiliary storage area (thus the sub storage area allowed writing to) to in response to a change of mode. Thus, no malicious code will be executed in this area.

Figure 3B:
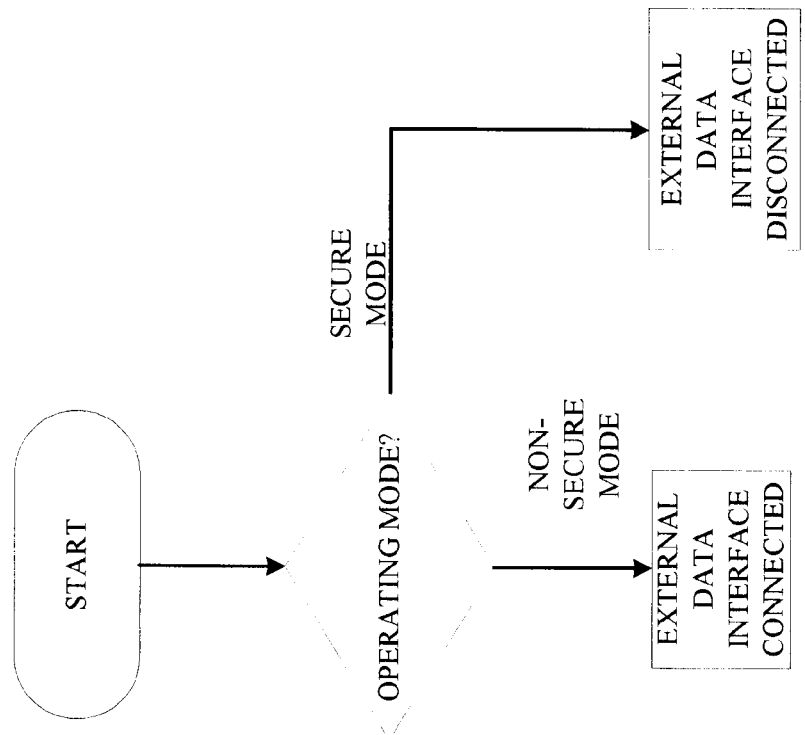
FIG. 3B shows a flowchart illustrating the control of the function of one or several external interfaces according to one embodiment of the invention.
Figure 3A:
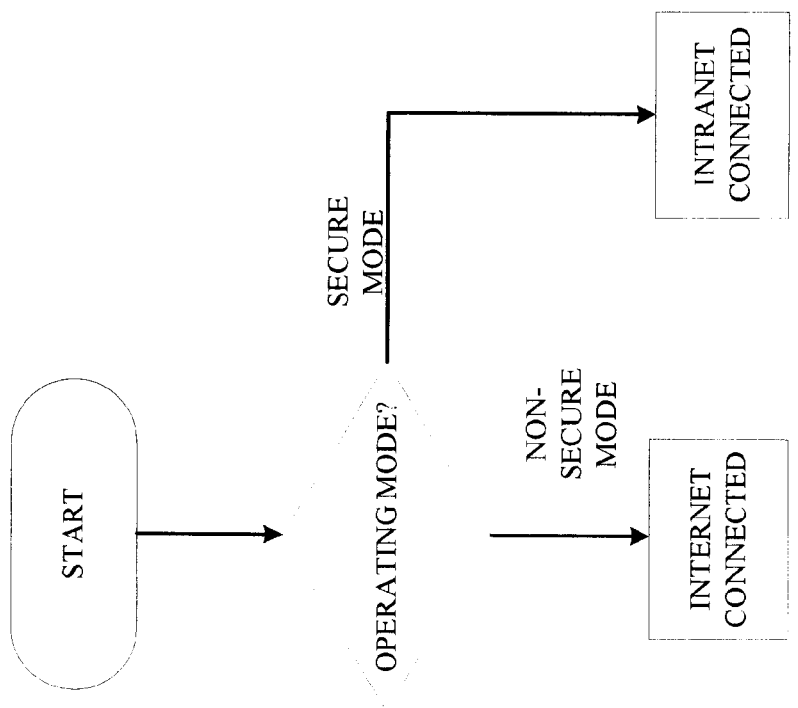
FIG. 3A shows a flowchart illustrating the function of a user control unit according to one embodiment of the invention.

In FIG. 3A a flowchart of the function of a user control unit according to one embodiment of the invention is illustrated. If the user selects secure mode, then the apparatus will be connected to LAN, e.g. Intranet. If the user selects non-secure mode, then the apparatus will be connected to WAN, e.g. Internet.

In FIG. 3B a flowchart is shown, which illustrates control of the function of one or several external interfaces such as USB according to one embodiment of the invention. The method then comprises the step of controlling connection of the apparatus to one or several external data interfaces in dependence on the selected mode. According to one embodiment, if the user selects secure mode, then the external data interface(s) will be disabled, i.e. disconnected. If the user selects non-secure mode, then the external data interface(s) will be enabled, i.e. connected.

Figure 3C:
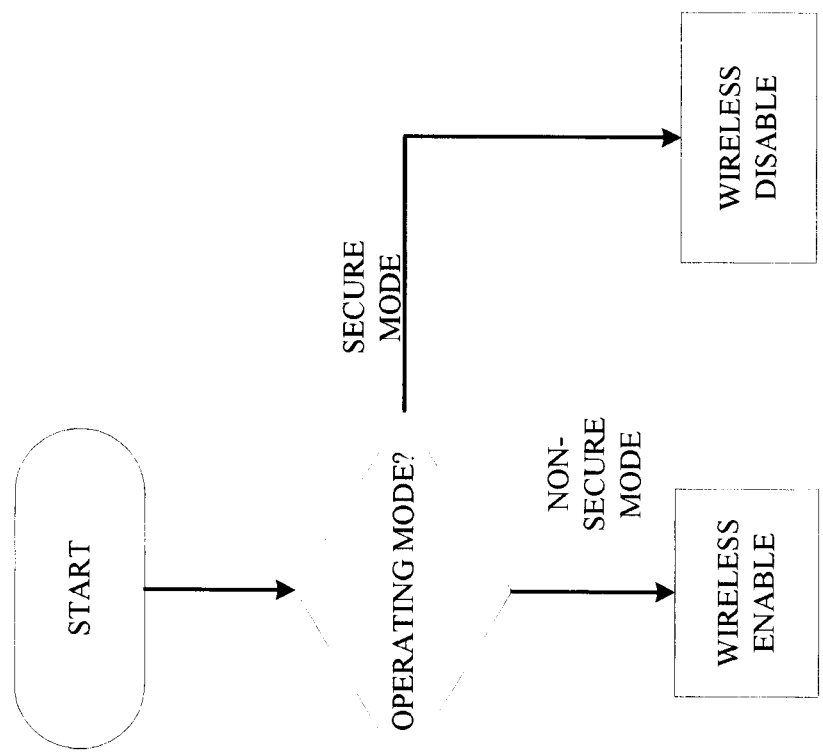
FIG. 3C shows a flowchart illustrating the control of a wireless network connection according to one embodiment of the invention.

In FIG. 3C a flowchart is shown, which illustrates control of a wireless network connection according to one embodiment of the invention. The method then comprises the step of controlling connection of the apparatus to a wireless network in dependence on the selected mode. According to one embodiment, if the user selects secure mode, then the wireless network connection will be disabled. If the user selects non-secure mode, then the wireless network connection will be enabled. Thus, according to this embodiment wireless connection is only possible for WAN.

Figure 4A:
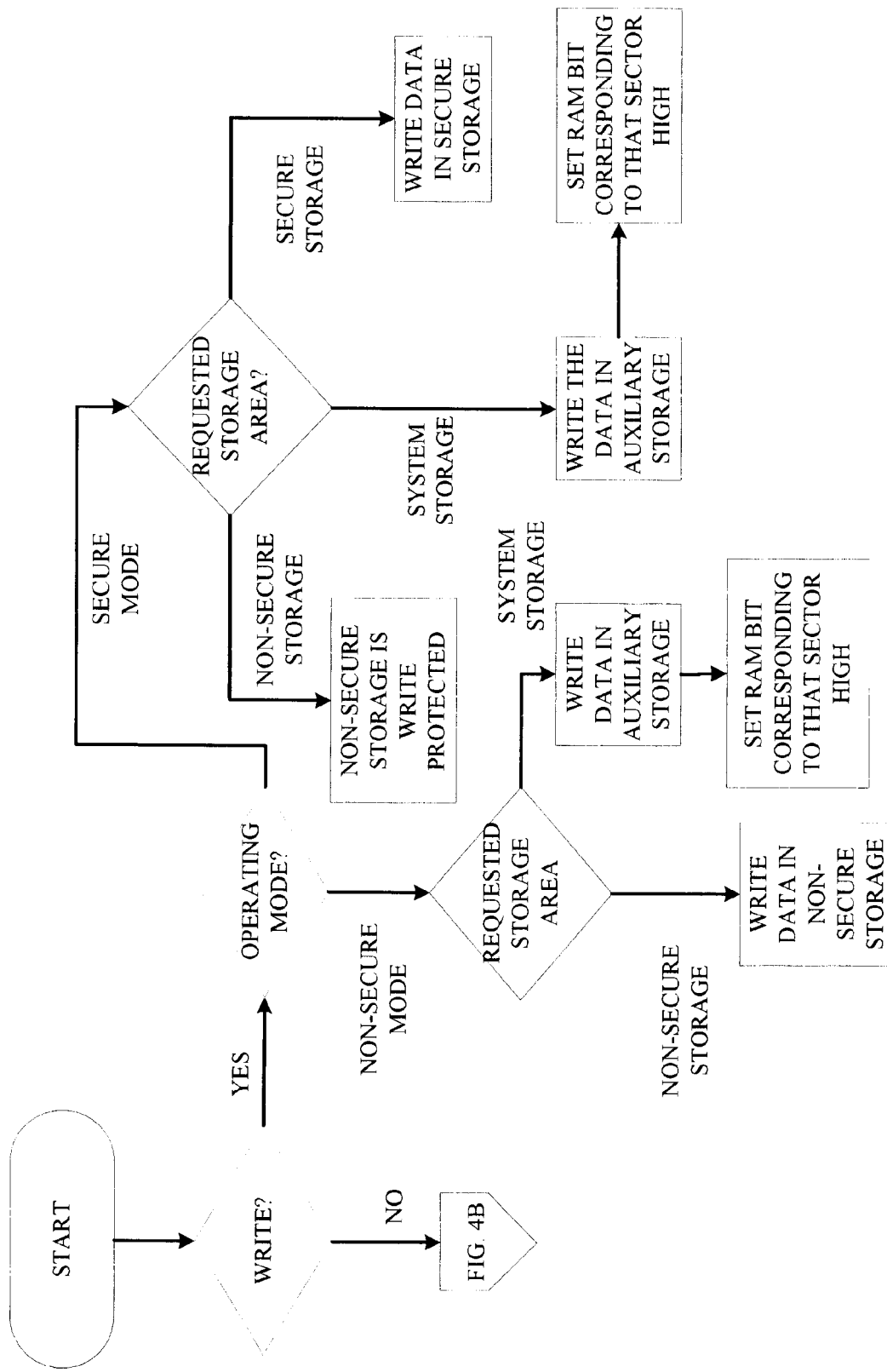
FIG. 4A shows a flowchart of the steps of the method according to one embodiment of the invention, when a normal user attempts to write in a memory of the apparatus.

FIG. 4A shows a flowchart of the steps of the method according to one embodiment of the invention, when a normal user attempts to write in a memory of the apparatus. The main control unit receives the write request, and checks which operating mode the apparatus is working in. If in secure mode, the apparatus is connected to LAN and is allowed to write in secure storage area or in system storage area. Thus, according to one embodiment, the method comprises writing to a secure storage area of the plurality of storage areas when the apparatus is connected to LAN, which is not accessible when the apparatus is connected to WAN. Depending of which storage area that is requested, the write request is directed to either the auxiliary storage area of the system storage or to the secure storage area. If writing is done in the auxiliary storage area, a RAM bit corresponding to that sector is set to a high status in an internal table of the main control unit. The non-secure storage area is according to this embodiment write protected when the apparatus is connected to LAN, and thus in a secure mode. This configuration will prevent data from being copied from the secure storage area to the non-secure storage area when in a secure mode, such that this data later on when the mode is changed to non-secure mode may be picked up by malware and transferred via WAN, e.g. Internet. For example, if the non-secure storage area was writeable in secure mode, and if malware was running on the apparatus, then the malware may copy content present on the secure storage area to the non-secure storage area. After the user later on has changed to a non-secure mode, in which the secure storage area is not visible, the malware may pick up data from the non-secure storage area that it previously copied to the non-secure storage area from the secure storage area, and transmit the data via WAN, e.g. Internet. By making the non-secure storage area write protected when connected to LAN and thus in a secure mode, the content on the secure storage area is protected from this scenario. If the apparatus is working in a non-secure mode, the apparatus is connected to WAN and is allowed to write in non-secure storage area or in system storage area. Depending of which storage area that is requested, the write request is directed to either the auxiliary storage area of the system storage or to the non-secure storage area. If writing is done in the auxiliary storage area, a RAM bit corresponding to that sector is set to a high status in an internal table of the main control unit. Thus, writing requests to the system storage area are handled in the same way irrespective of the mode.

Figure 4B:
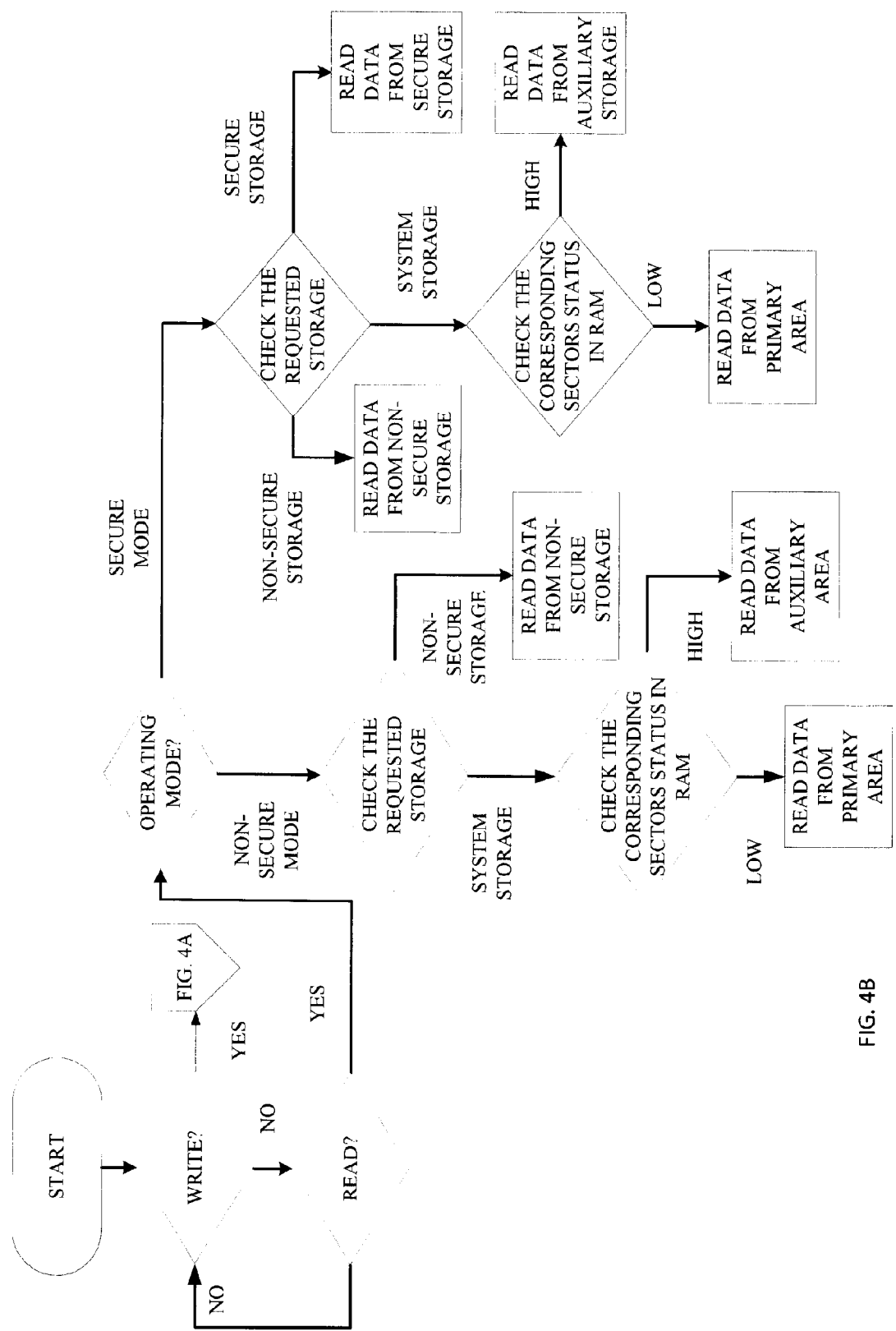
FIG. 4B shows a flowchart of the steps of the method according to one embodiment of the invention, when a normal user attempts to read in a memory of the apparatus.

FIG. 4B shows a flowchart of the steps of the method according to one embodiment of the invention, when a normal user attempts to read in a memory of the apparatus. The main control unit receives the read request, and checks which operating mode the apparatus is working in. If in secure mode, the apparatus is connected to LAN and is allowed to read from non-secure storage area, from secure storage area or from system storage area. Thus, according to one embodiment, the method comprises reading of a secure storage area of the plurality of storage areas when the apparatus is connected to LAN, which is not accessible when the apparatus is connected to WAN. Depending of which storage area that is requested, the read request is directed to the non-secure storage area, the secure storage area or the system storage area. In response to a request to read in the system storage area, the main control unit checks the status of the internal table to know from which area to read from. Depending on the status of the sector in the internal table in e.g. RAM, data will be read from the auxiliary storage area or the primary storage area of the system storage area. If the apparatus is working in a non-secure mode, the apparatus is connected to WAN and is allowed to read from the non-secure storage area and the system storage. Depending of which storage area that is requested, the read request is directed to the non-secure storage area or the system storage area. In response to a request to read in the system storage area, the main control unit checks the status of the internal table to know from which area to read from. Depending on the status of the sector in the internal table, data will be read from the auxiliary storage area or the primary storage area of the system storage area. Thus, read requests to the system storage area are handled in the same way irrespective of the mode.

Figure 5A:
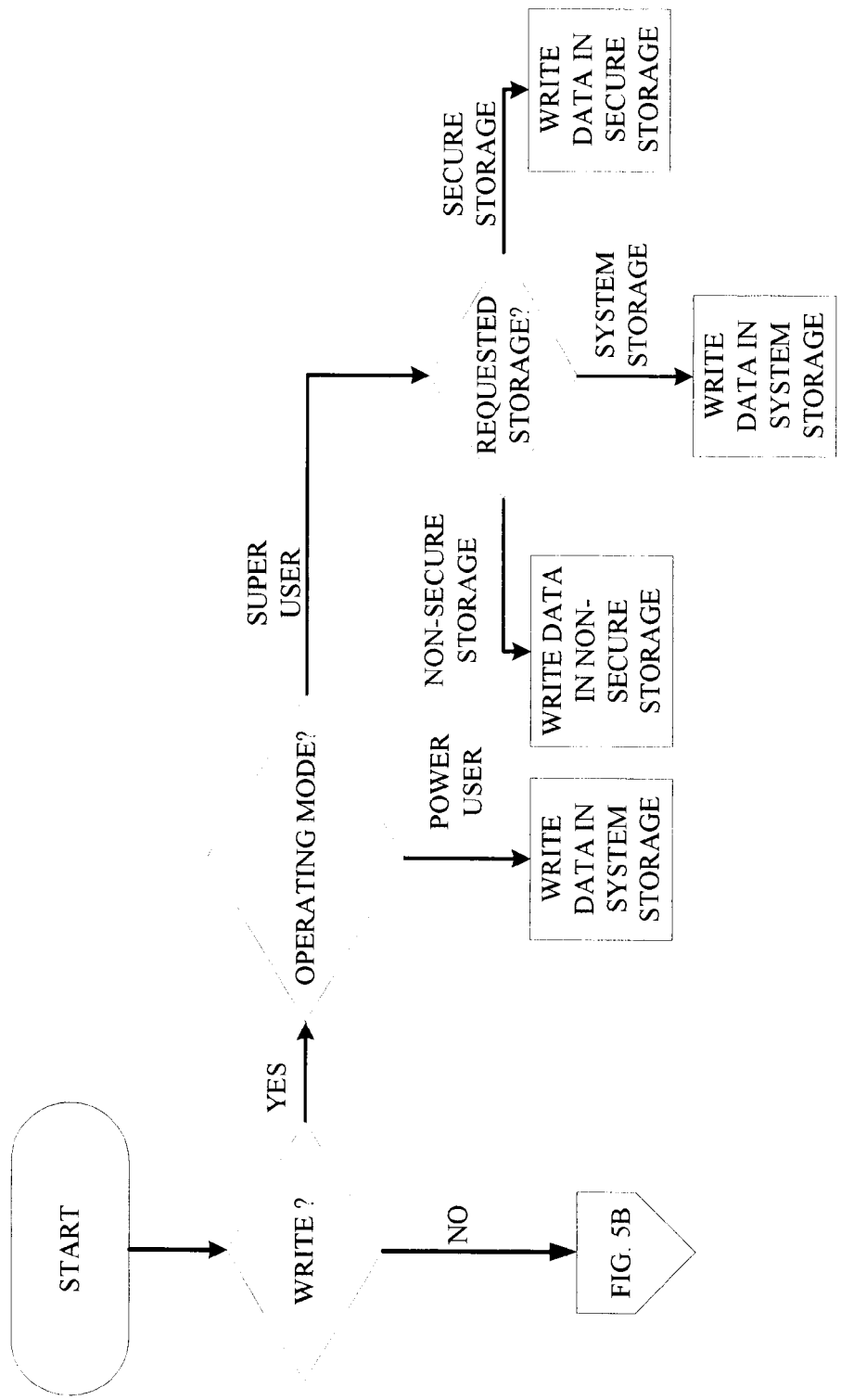
FIG. 5A shows a flowchart of the steps of the method according to one embodiment of the invention, when an administrator attempts to write in a memory of the apparatus.

In the FIGS. 5A and 5B, two administrator modes are illustrated, super user mode and power user mode. The main control unit is configured to control the data flow as explained below when in respective mode. According to one embodiment, the administrator modes are controlled from a separate administrator control unit as illustrated in FIG. 1. This control unit is the preferably a hard ware unit as the user control unit. According to another embodiment, the administrator modes are incorporated in the user control unit. According to one embodiment, the administrator modes are divided into still more separate modes with different privileges.

FIG. 5A shows a flowchart of the steps of a method according to one embodiment of the invention, when an administrator attempts to write in a memory of the apparatus. If the apparatus is in a so called super user mode, the write request is directed to the non-secure storage area, the system storage area or the secure storage area. In a so called power user mode, the user has access to the system storage area only. In this mode the user can read, write and delete from the system storage area. The other two storage areas non-secure storage area and secure storage area are invisible to the user in this mode of operation. In response to a write request in this mode, the data will be written in the system storage area. The purpose of having a power user mode is to update or install the OS and software when needed. Preferably, the apparatus may only be connected to LAN when in power user mode.

FIG. 5B shows a flowchart of the steps of a method according to one embodiment of the invention, when an administrator attempts to read in a memory of the apparatus. If the apparatus is in super user mode, the read request is directed to the non-secure storage area, the system storage area or the secure storage area depending on which storage area that is requested. If in power user mode, a read request is directed to the system storage area.

The present invention is not limited to the above-described preferred embodiments. Various alternatives, modifications and equivalents may be used. For example, the embodiments described herein may be combined with each other to create new embodiments. Therefore, the above embodiments should not be taken as limiting the scope of the invention, which is defined by the appending claims.

The invention claimed is:

1. An apparatus for the protection of data stored in a data storage unit comprising a plurality of storage areas; the apparatus comprising:
   the data storage unit;
   a data interface for connection to a computer system and for transfer of one or more data signals from the computer system to the protection apparatus indicating request(s) for access to said data storage unit;
   a main control processor configured to receive said data signals, wherein said main control processor is connected to said data storage unit;
   a user control processor connected to said main control processor, wherein said user control processor is arranged to be set in different modes and to generate a mode selection signal indicating a selected mode;
   wherein said main control processor comprises access rules for respective mode for access of said storage areas, and is configured to receive said mode selection signal, and in dependence on the selected mode:
      control connection of the apparatus to a plurality of networks; and
      direct said request(s) for access to a storage area of said plurality of storage areas of said data storage unit;
   wherein the plurality of storage areas comprises a system storage area divided into sub storage areas of which one is allowed writing to; and
   wherein the main control processor comprises an internal table, the main control processor also being configured to check the internal table indicating where data has been written in the sub storage area allowed writing to, and is configured to read from one of said sub storage areas in dependence on the result of the checking, and further is configured to delete all data from said sub storage area allowed writing to in response to a mode selection signal indicating a mode different from a current mode.

2. Apparatus according to claim 1, wherein said plurality of networks comprises LAN (Local Area network) and/or WAN (Wide Area Network).

3. Apparatus according to claim 2, wherein said plurality of storage areas comprises a secure storage area which is not accessible when said apparatus is connected to a WAN.

4. Apparatus according to claim 2, wherein said plurality of storage areas comprises a non-secure storage area which is write protected when said apparatus is connected to a LAN.

5. Apparatus according to claim 1, wherein said main control processor is configured to update the internal table indicating where data has been written in said sub storage area when data is written in said sub storage area which is allowed writing to.

6. Apparatus according to claim 1, comprising a wireless network control processor configured to control connection of the apparatus to a wireless network in dependence on the selected mode.

7. Apparatus according to claim 1, comprising an external data interface controller configured to control connection of the apparatus to one or several external data interfaces in dependence on the selected mode.

8. Method for the protection of data stored in a data storage unit in an apparatus, wherein said data storage unit comprises a plurality of storage areas, and wherein said method comprises the steps of:
   selecting a mode of operation for the apparatus;
   controlling connection of said apparatus to a plurality of networks depending on the selected mode;
   receiving one or more requests for access to said data storage unit;
   directing said one or more requests to a storage area of said plurality of storage areas depending on selected mode; and
   wherein said plurality of storage areas comprises a system storage area divided into sub storage areas of which one is allowed writing to, and wherein said method comprises the steps of checking an internal table indicating if data has been written in said sub storage area allowed writing to, and reading from one of said sub memory areas in dependence on the result of the checking, and deleting all data from said sub storage area allowed writing to in response to a change of mode.

9. Method according to claim 8, wherein said plurality of networks comprises a LAN (Local Area network) and/or a WAN (Wide Area Network).

10. Method claim 8, wherein said requests are directed to a storage area in accordance with access rules for respective mode.

11. Method according to claim 8, wherein said method comprises the step of updating the internal table indicating if data has been written in said sub storage area when data is written in said sub storage area which is allowed writing to.

12. Method according to claim 8, comprising writing to or reading of a secure storage area of said plurality of storage areas when the apparatus is connected to a LAN, which is not accessible when said apparatus is connected to a WAN.

13. Method according to claim 8, comprising writing or reading to a non-secure storage area of said plurality of storage areas when said apparatus is connected to a WAN.

14. Method according to claim 8, comprising controlling connection of the apparatus to a wireless network in dependence on the selected mode.

15. Method according to claim 8, comprising controlling connection of the apparatus to one or several external data interfaces in dependence on the selected mode.

16. A computer-usable medium comprising a computer program code configured to cause a processor to execute a method for the protection of data stored in a data storage unit in an apparatus, wherein said data storage unit comprises a plurality of storage areas, and wherein said method comprises the steps of:
   selecting a mode of operation for the apparatus;
   controlling connection of said apparatus to a plurality of networks depending on the selected mode;
   receiving one or more requests for access to said data storage unit;
   directing said one or more requests to a storage area of said plurality of storage areas depending on selected mode; and wherein said plurality of storage areas comprises a system storage area divided into sub storage areas of which one is allowed writing to, and wherein said method comprises the steps of checking an internal table indicating if data has been written in said sub storage area allowed writing to, and reading from one of said sub memory areas in dependence on the result of the checking, and deleting all data from said sub storage area allowed writing to in response to a change of mode.

17. A computer system comprising an apparatus according to claim 8.

* * * * *